Oct. 13, 1959 D. GOLDSTEIN 2,908,426
FLEXIBLE SPOUT COMBINATION STOPPER AND POURING DEVICE
Filed March 28, 1957 3 Sheets-Sheet 2

INVENTOR
DANIEL GOLDSTEIN
BY
Mock & Blum
ATTORNEYS.

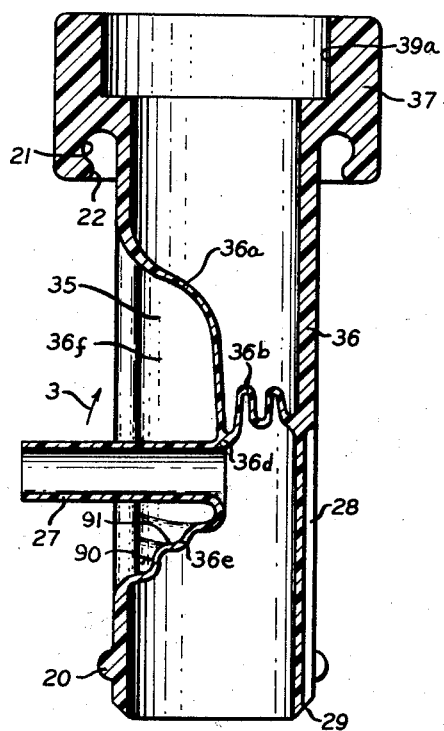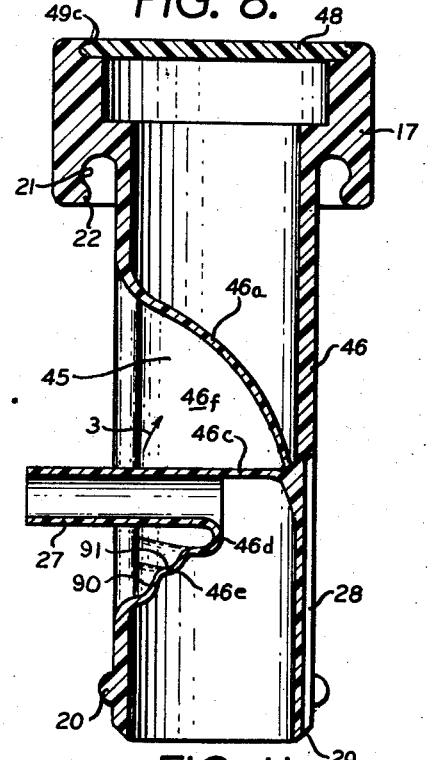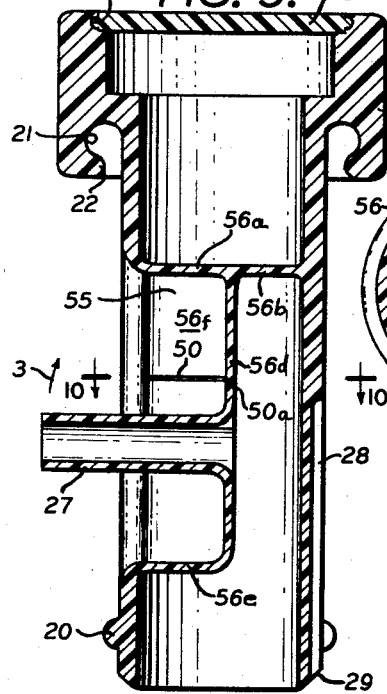

United States Patent Office 2,908,426
Patented Oct. 13, 1959

2,908,426

FLEXIBLE SPOUT COMBINATION STOPPER AND POURING DEVICE

Daniel Goldstein, New York, N.Y., assignor to Schenley Industries, Inc., New York, N.Y., a corporation of Delaware Application March 28, 1957, Serial No. 649,192

17 Claims. (Cl. 222—515)

This invention relates to an improved insert for the neck of a bottle, which insert has the dual functions of a bottle stopper and a non-drip pouring device. My invention also relates to the combination of said insert and said bottle.

My invention is particularly useful in conjunction with the storage, shipping and pouring of most kinds of liquids. It is difficult to pour most liquids out of a bottle into another container without splashing of the liquid, and without dripping of the liquid down the side of the bottle at the conclusion of the pouring operation. It is inconvenient to have to remove a bottle closure and substitute a separate pouring device. It is undesirable and unduly expensive to utilize a combination bottle stopper and pouring device having a plurality of moving parts.

An important object of my invention is to provide an insert for the neck of a bottle, which insert may be lowered within the neck to act as a bottle stopper, and which may be raised in the neck to act as a pouring device. I highly prefer to provide the pouring device with a transverse, outwardly extending spout which projects beyond the periphery of the neck when the pouring device is in its raised or pouring position.

Such a spout has at least three advantages. In the first place, the outwardly extending spout aids visually to determine the way in which the bottle should be oriented for pouring purposes. In the second place, the outwardly protruding spout reduces the chances of drops of liquid falling upon the outer surface of the bottle while the bottle is being returned from its pouring position to an erect position. In the third place, a spout results in improved flow of liquid and reduces the possibility of splashing of the liquid and makes it possible to control more accurately the amount of liquid which is dispensed. Accordingly, a further important object of my invention is to provide the insert for the neck of the bottle with a spout which is automatically retracted upon lowering of the insert, so as to permit the insert to move to a bottle stopper position in which the spout is wholly located within the neck of the bottle.

In preferred embodiments of my invention, I preferably mold the insert in the general shape of a tube, which is made of a moldable plastic or other suitable material which is not wetted by most liquids, which is at least somewhat flexible and which is resilient. Polyethylene is an example of a suitable plastic. The bore of the tube is closed at a point remote from its lower end, and the tube has an enlarged integral head at its upper end. This tube is sized so that it may be inserted slidably frictionally into the bore of a bottle neck until the tube head abuts the lip of the neck, in which position the tube serves as a highly effective bottle stopper.

In order that the insert may also serve as a pouring device, a portion of the peripheral wall of the tube, below its head, is offset inwardly to define a recess. Said offset portion of the peripheral wall of the tube serves as the inner wall of said recess. A flexible spout extends outwardly from the inner wall of the recess. The spout bore communicates with the tube bore. The tube also has an air vent. When the insert is in its pouring position, in which the tube head is spaced above the mouth of the bottle and in which the spout is also located above the mouth of the bottle, the spout is straight and extends radially with respect to the axis of the tube. Also, the spout protrudes beyond the recess and beyond the periphery of the bottle neck.

As an important optional feature of the invention, the wall of the recess is thin so as to greatly increase the flexibility and resiliency thereof, relative to the main wall of the tube, and hence make the spout relatively freely movable relative to the tube. Accordingly, when the spout is to be retracted into the recess in order to permit the insert to be lowered toward its stopper position, it is not necessary that only the spout bend, since the wall of the recess can also bend. This reduces the strain upon the material of the spout. In addition, in certain embodiments of my invention, the recess wall, in addition to being thin, is shaped and corrugated to act as the wall of a bellows. This greatly increases the flexibility and resiliency of the recess wall.

When the insert is lowered from pouring position toward stopper position, the spout strikes the rim of the bottle and is forced upwardly and inwardly until it is wholly retracted within the tube recess. This movement of the spout is the result of its own flexibility and of the optional considerable flexibility of the recess wall. This movement of the spout permits the insert to move to its stopper position. When the insert is raised to pouring position, the spout automatically returns to its extended position. The flexible recess wall exerts a spring-like action upon the spout to aid in returning it to its extended position.

As important advantages of the invention, the great resiliency of the recess wall reduces the risk of the spout wall cracking at its base end. Also, if the spout has any tendency to "set" in its retracted position, after prolonged storage of the bottle, the great resiliency of the recess wall tends to overcome any "setting" of the spout and to return it to extended position. The fact that the spout extends beyond the periphery of the bottle neck when the insert is in pouring position causes the last drops of liquid to fall free of the bottle, so that the insert is a "non-drip" pouring device. Also, the extended spout aids visually to determine the way in which the bottle should be oriented for pouring purposes. The insert need never be entirely removed from the bottle. In fact, I optionally provide the bottle neck and the insert with cooperating means for releasably locking the insert in both of its positions.

As another feature of the invention, in certain of the embodiments, the bore of the tube is closed at a point directly above the level of the spout, in such a way as to provide a generally dome-shaped recess. This recess aids in preventing dripping of liquid from the spout at the conclusion of the pouring operation, in a manner described in detail in my prior U.S. application, Serial No. 641,196, filed February 19, 1957, for Combination Container Closure and Pouring Device.

As another feature of the invention, the spout itself is optionally corrugated so as to increase the flexibility thereof.

Other objects and advantages of the invention will become more readily apparent from the following description in conjunction with the annexed drawing.

In the drawings,

Fig. 1 is a vertical section of a first embodiment of the invention, showing the insert mounted within the neck of a bottle and in its bottle sealing position. The lower part of the bottle is broken away. The scale of Fig. 1 is approximately 2:1.

Fig. 3 is a side elevation of the insert according to the first embodiment, the view being taken toward the open mouth of the pouring spout.

Fig. 4 is a view similar to Fig. 3, but in this view the insert is viewed from the opposite direction than that of Fig. 3.

Fig. 5 is a section on line 5—5 of Fig. 3.

Fig. 6 is a section on line 6—6 of Fig. 3.

Fig. 7 is a vertical section of a second embodiment of the insert.

Fig. 8 is a vertical section of a third embodiment of the insert.

Fig. 9 is a vertical section of a fourth embodiment of the insert.

Fig. 10 is a section on line 10—10 of Fig. 9.

Fig. 11 is a vertical section of a fifth embodiment of the insert.

*First embodiment*

Figure 1:
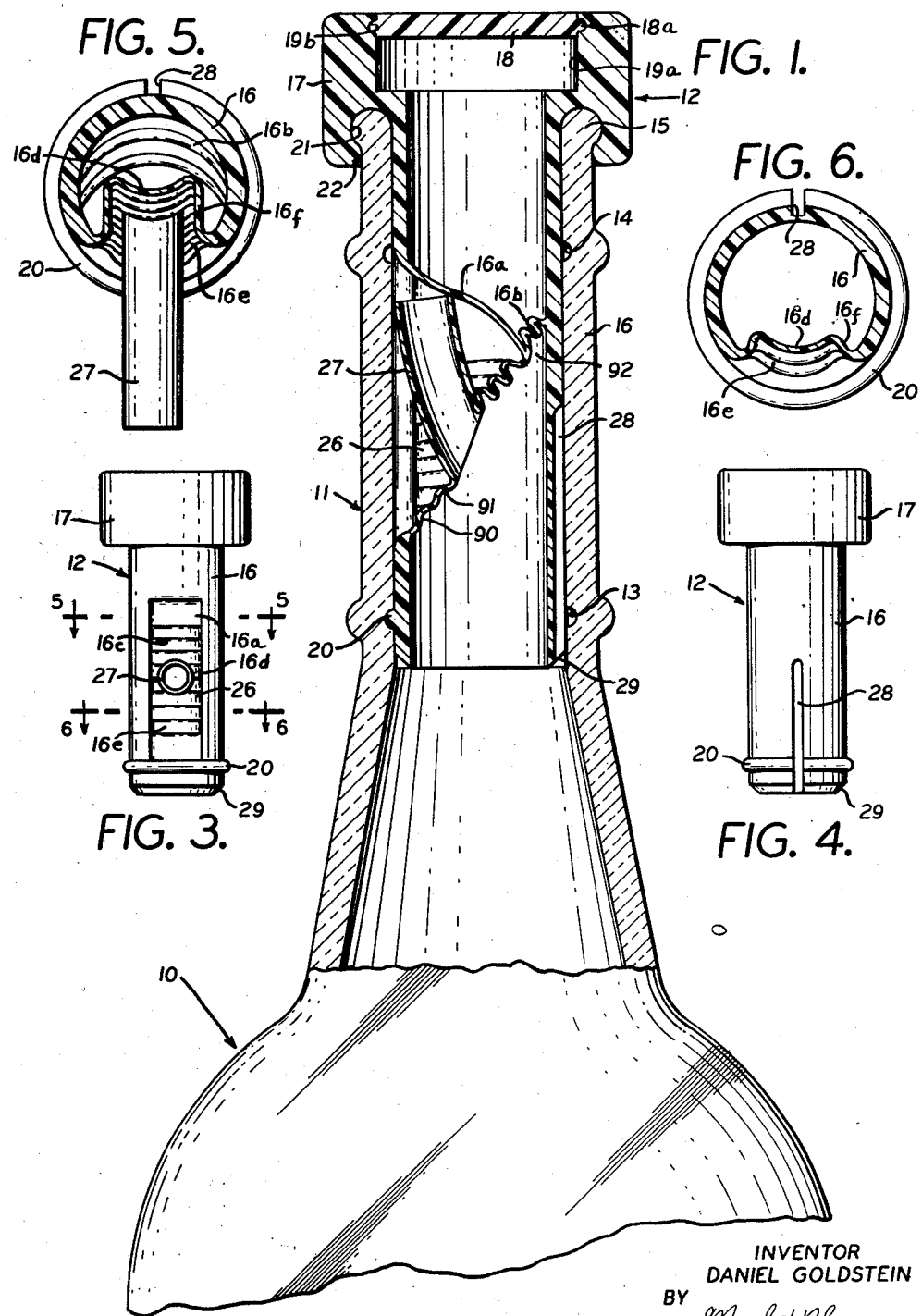
Figures 2, 12:
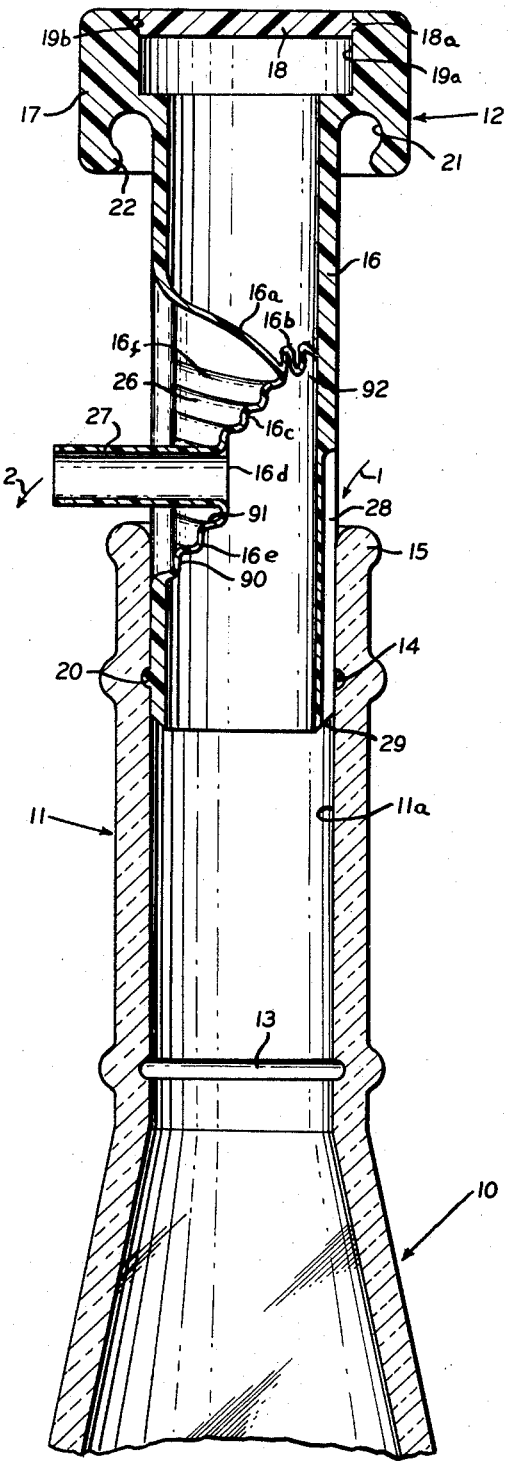
Fig. 2 is a view similar to Fig. 1, showing the insert in pouring position.
Fig. 12 is a vertical section of a sixth embodiment of the insert.

Figs. 1–6 show a bottle 10 having a neck 11, and an insert 12 movably positioned within bore 11a of neck 11. Said insert comprises a tube 16 and head 17. Tube 16 has a recess 26 in its outer peripheral surface and a spout 27 connected to the inner wall of recess 26. In the description, it will be assumed that bottle 10 is erect and upright. Therefore, head 17 is at the upper end of tube 16. The position of insert 12 shown in Fig. 1, wherein head 17 is releasably locked to upper end bead 15 of neck 11, and wherein spout 27 is wholly within recess 26 and wholly within neck bore 11a, is defined as the stopper position of insert 12. The position of spout 27 in Fig. 1 is defined as its retracted position. The position of insert 12 shown in Fig. 2, wherein insert 12 is releasably locked to neck 11 with head 17 remote from bead 15, and wherein spout 27 is above neck 11 and protrudes out of recess 26 and beyond the periphery of neck 11, is defined as the pouring position of insert 12. The position of spout 27 in Fig. 2 is defined as its extended position.

Bottle 10 may be of any appropriate shape and is optionally made of glass. Neck 11 of bottle 10 is of generally cylindrical and elongated shape. It will be apparent that the invention may be used in conjunction with any appropriate container made of any appropriate material, having a generally cylindrical outlet bore.

The upper portion 11a of the bore of neck 11 is optionally substantially cylindrical, although the invention is not strictly so limited. The inner periphery of bore 11a is provided with a circumferentially extending annular grove 13 near the bottom thereof, and a similar groove 14 near the top thereof. The upper end of neck 11 is optionally and preferably provided with annular, outwardly and circumferentially extending, rounded bead 15.

Insert 12 may be made of any suitable material which is flexible and compressible and which is resilient. Highly preferably, insert 12 is made of a material which is not wetted by water, wine, vinegar and many other liquids. As one example, and without limitation thereto, insert 12 is made of polyethylene. Said insert 12 comprises elongated generally cylindrical shank or tube 16 and hollow head 17. Said insert 12 is preferably molded in a single piece, with the exception of an optional top closure disc 18 for head 17.

Preferably, the tube or shank 16 is sized for frictional sliding movement within bore 11a. The main portion of tube 16 is sufficiently thick so as to be relatively rigid, except that its peripheral wall is somewhat compressible. Tube 16 is of sufficient diameter so as to be slightly compressed by its insertion within bore 11a so as to improve the seal between tube 16 and the wall of bore 11a. The lower end of tube 16 is optionally provided with an annular bevel 29 to facilitate the initial insertion of tube 16 into bore 11a. The diameter of head 17 is greater than the diameter of bead 15. The central through bore 19 and tube 16 extends upwardly into head 17 to a point above the level of the lip of neck 11 (when the insert is in its sealing position of Fig. 1), and communicates at its upper end with a bore 19a within head 17 of increased diameter. This bore 19a preferably extends to the upper face of head 17.

Tube 16 is preferably provided adjacent its lower end with an outwardly and circumferentially extending annular bead or rib 20. In addition, an annular and circumferentially extending groove 21 is optionally formed in the lower face of head 17, and has a shape generally corresponding to that of the rounded portion of bead 15. In addition, groove 21 is undercut so that it outer peripheral wall has an inwardly extending annular bead portion 22 at the lower end thereof.

As shown in Fig. 1, in the stopper position of insert 12, rib 20 is located frictionally and releasably within groove 13, and bead 15 is located frictionally within groove 21, with bead 22 underlying bead 15. As shown in Fig. 2, in the pouring position of neck 11, bead 20 is located frictionally and releasably within groove 14, with head 17 elevated above the lip of neck 11.

Optionally, as shown in Fig. 11, the tube may be provided with a further rib 23 which is located within groove 14 when rib 20 is located within groove 13. Optionally, also, as shown in Fig. 11, instead of a groove in the peripheral wall of bore 11a, the wall of bore 11a may have an inwardly extending annular rib 24. The lower annular rib of the tube may snap through the central space of rib 24 to underlie rib 24 in the stopper position of insert 12.

It will be apparent that the means for locking the insert in its respective positions may be varied in any suitable manner. Optionally, also, the means for releasably locking the insert in either of its positions may optionally be omitted.

The optional closure disc 18 for tube 11 may be provided with an annular peripheral rib 18a which may be forcefitted into a corresponding annular peripheral groove 19b in the wall of bore 19a.

If the optional disc 18 is omitted, as in the embodiments of Figs. 7 and 11, the open top of insert 12 facilitates the movement of the insert from its stopper position to its pouring position. In the position of Fig. 1, it is possible to squeeze the peripheral wall of head 17 inwardly (when disc 18 is omitted), so as to aid in making the bead 22 clear bead 15, in order to release the insert and permit its upward movement.

The top closure may be modified in any suitable manner, and disc 18 may optionally be secured in place by any suitable means.

Intermediate the end portions of tube 16, said tube 16 is provided with the previously mentioned side recess 26 wherein spout 27 is located. Said recess 27 has an inner wall 16a, 16c, 16d, 16e and side walls 16f. As viewed in vertical section (Fig. 2), the upper inner wall portion 16a extends downwardly and inwardly from the main portion of the peripheral wall of tube 16. The lower end of wall portion 16a connects with the upper end of wall portion 16c, which is forwardly downwardly inclined. The lower end of wall portion 16c connects with the upper end of wall portion 16d, which extends downwardly and substantially vertically, as viewed in Fig. 2. Wall portion 16e connects the lower end of wall portion 16d to the main portion of the peripheral wall of tube 16 and is forwardly downwardly inclined.

As viewed in horizontal section (Figs. 5 and 6), wall portions 16a, 16c, 16d and 16e are convex. At their outer and rearmost ends, they connect with the recess side walls 16f. Said walls 16f extend inwardly from the main portion of the peripheral wall of recess 26 and are optionally parallel to each other. The shape of wall 16f, as viewed in elevation, is clearly shown in Fig. 2. Walls 16a, 16c, 16d, 16e and 16f are relatively thin, so as to increase their flexibility.

Also, as clearly shown in Figs. 1–6, the wall portions 16c, 16d, 16e and 16f are shaped much like the wall of a bellows. Each of these wall portions, as viewed in vertical section, is shaped in a series of sets of vertical risers 90 and horizontal steps 91, each set 90, 91 being offset relative to a succeeding set 90, 91. This greatly increases the flexibility and resiliency of the inner wall of recess 26. Each set 90, 91 extends across a respective wall 16c, 16d or 16e and extends at its sides across the respective walls 16f.

The flexible spout 27 connects with and is located centrally relative to wall portion 16d, as shown in Fig. 3. Spout 27 interrupts the riser and step sets 90, 91, in wall portion 16d. Spout 27 normally extends radially outwardly from wall portion 16d. When insert 12 is in its pouring position, spout 27 protrudes beyond recess 26 above the lip of neck 11 and past the outer peripheral surface of neck 11.

Optionally, bore 19 of tube 16 is sealed by a thin flexible cross wall 16b at the constricted bore portion at the lower end of wall portion 16a. Said wall 16b is preferably also of bellows-like shape, and the configuration of wall 16b is clearly shown in Figs. 2 and 5. Tube 16 has a vertically extending air vent groove 28 in the outer surface of its peripheral wall. Vent groove 28 is located opposite spout 27. In the pouring position of insert 12, vent groove 28 extends above the lip of neck 11. Groove 28 also extends to the lower end of insert 12.

In use, when liquid is to be poured from bottle 10, insert 12 is placed in its position of Fig. 2, with rib 20 releasably locked in groove 14. Arrow 2 shows the direction of flow of liquid out of spout 27. Arrow 1 shows the direction of air intake into vent groove 28. The outwardly protruding spout 27 serves as a visual guide in the determination of the proper orientation of the bottle for flow of liquid out of the spout and into the vessel being filled. In addition, when the bottle is being returned to erect condition, the last drops of liquid in spout 27 either return to the bottle or fall out of the spout, clear of the neck of the bottle. This results from the outward protrusion of the spout and from the material of which it is made. Accordingly, the insert functions as a non-drip pouring device.

The wall 16c, wall 16b, main peripheral wall of tube 16 and walls 16f together define a recess 92 in the tube which is located just above the level of spout 27. This recess 92 is open only at the lower end thereof.

Said recess 92 serves to reduce the possibility of dropping of liquid from spout 27 at the conclusion of the pouring operation. During the pouring operation, when the bottle is partially inverted in order to pass liquid outwardly through spout 27, surplus liquid enters recess 92, either partially or wholly, depending upon the size and shape of the recess and the velocity of the flow of the liquid. In the event that recess 92 is not completely filled with liquid, an air bubble is formed within recess 92.

At the conclusion of the pouring operation, and whether or not the air bubble in recess 92 has been formed, when the bottle is moved from its pouring position toward a more upright position, liquid falls by gravity out of recess 92, thereby creating a partial vacuum therein. This partial vacuum serves to create a suction upon the bore of spout 27 so as to tend to draw the liquid therein inwardly in a cohesive mass. This suction continues until the bore of the spout is not completely blocked by the liquid, permitting entry of air therein; but if the return movement of the bottle is sufficiently rapid, at this time the bottle is sufficiently restored to the upright position so that the last drops of liquid may be retained within the spout and permitted to flow backwardly into the bottle. When the bottle is to be sealed, either for initial shipment or for storage, insert 12 is lowered to its stopper position of Fig. 1. During this movement, spout 27 strikes the lip of neck 11. Spout 27 is bent somewhat, and in addition the wall portions 16a, 16b, 16d, 16e and 16f are flexed in the manner shown in Fig. 1, so that the spout 27 is retracted into recess 26. Upon comparison of Fig. 1 and Fig. 2, it will be noted that wall 16e is pivoted outwardly and is slightly elongated, while wall 16c is pivoted inwardly and is slightly compressed. The upper portions of walls 16f are flexed in a generally upward rearward direction, and wall 16b is somewhat compressed.

As the result of the movement of the insert to its position of Fig. 1, the upper portion of tube 16 is tightly frictionally interfitted within the bore of the bottle neck, above groove 14, resulting in a sealing of the contents of the bottle. The interfitting of neck bead 15 within groove 21, in the manner shown in Fig. 1, strengthens the assembly against the possibility of upward movement of the insert by reason of the possible generation of gases within the bottle (depending upon the nature of the liquid contents thereof).

Since the retraction of the spout results only partly from its bending, and also results from flexing of the inner recess wall, the risk of cracking of the wall of the spout is minimized. Also, the great resilience of the inner recess wall helps to assure automatic return of the spout to its extended position when insert 12 is again raised to its pouring position.

Second embodiment (Fig. 7)

Since this is similar to the first embodiment (like parts being designated by like reference characters), only the differences will be mentioned.

In Fig. 7, disc 18 is omitted, bore 39a of head 37 being accordingly uniform. This makes it possible to squeeze the upper periphery of head 37 inwardly and thereby flex bead 22 outwardly, to aid in clearing bead 22 from neck bead 15 when insert 12 is being raised from its stopper position.

It will be apparent that disc 18 can be omitted in the first embodiment, with the same result as in the second embodiment.

The shape of the inner wall of recess 35 is modified in the second embodiment. In this embodiment, the uncorrugated wall 36a connects directly with wall 36d, which corresponds to wall 16d of the first embodiment. This means that there is no wall corresponding to wall 16c. Wall 36e corresponds to wall 16e. Only the portions of side recess walls 36f on the general level of walls 36d and 36e are corrugated. The upper portion of wall 36a is downwardly inwardly inclined from the main peripheral wall portion of tube 36 of this embodiment, and the lower portion of wall 36a extends almost vertically to its junction line with wall 36d.

In the second embodiment, sealing wall 36b is optionally located just above spout 37, as is clearly shown in the drawing.

In the second embodiment, the insert is not shown mounted in a bottle, but it will be apparent that the insertion of the insert in a bottle, and the use of the insert are substantially the same in the two embodiments. Arrow 3 shows the direction of movement of spout 27 when the insert is lowered from its pouring position to its stopper position.

Third embodiment (Fig. 8)

In this embodiment, the optional top closure disc 48 is slightly modified from disc 18 of the first embodiment, in that the upper portion 49c of the bore of the head 17 is enlarged to provide a seat against which the disc 48 is seated. Bore 49c is grooved and the edge of disc 48 is curved appropriately to permit disc 48 to be snapped into place.

Also in this embodiment, wall 46a is modified from the corresponding walls 16a and 36a of the first two embodiments. Wall 46a extends substantially to the rear of the tube and to the level of the top of spout 27. A generally horizontal extending wall 46c connects the rear upper portion of spout wall 46d with the lower end of wall 46a. Wall 46e is similar to wall 36e and to wall 16e. Wall 46f is corrugated similarly to wall 36f.

It will be apparent that when the insert of this embodiment is moved to sealing position, in addition to wall portion 46e and the side recess wall portions 36f flexing, the wall of recess 45 flexes at the junction of wall portions 46a and 46c, to permit movement of the spout to its retracted position.

Fourth embodiment (Figs. 1 and 10)

In this embodiment, none of the recess walls are corrugated. Wall 46a extends substantially transversely and connects with a relatively long wall 56d which serves as the inner wall of the recess. Wall 56e is also substantially transverse. Accordingly, recess 55 of this embodiment is substantially rectangular in vertical section. Wall 56b, which corresponds to wall 16b of the first embodiment, is optionally on the same level as wall 56a.

While in this embodiment the recess wall is not corrugated, the thinness of the recess wall permits it to bend in a manner somewhat similar to that of the preceding embodiments, when the spout strikes the rim of the bottle. As a result, in this embodiment as well as in the preceding embodiments, it is not necessary for the spout to bend excessively when the insert moves to its stopper position.

As an optional feature of the invention, in order to improve the flexibility of the wall of recess 55, a slit 50 is formed in the two side walls 56f and in wall 56d, above spout 27. This slit 50 is downwardly bevelled on the three sides of the recess, as shown at 50a. When spout 27 is flexed toward retracted position, the lower portions of walls 56f and 56d are flexed relative to the upper portions thereof, at slit 50, to facilitate the movement of spout 27 into its retracted position within recess 5. When the insert is returned to pouring position, the resilience of the recess walls snaps them back to their positions of Fig. 9.

Fifth embodiment (Fig. 11)

In this embodiment, the walls 66a, 66d, 66e and 66f of recess 65 are rigid. This is also true of wall 66b. Spout 67, in this embodiment, does not protrude beyond recess 65. Hence, even in the stopper position of the insert, shown in Fig. 11, spout 67 is not flexed in any way.

It will be apparent that when the insert is raised to its pouring position, spout 67 will be located above neck 11, but will not protrude outwardly of the periphery thereof. However, as in the other embodiments, the tip of spout 67 is spaced from the walls of the recess, and is formed of a non-wettable material such as polyethylene. In addition, wall 66b is located above spout 67 a sufficient distance to provide a recess 99 corresponding to recess 92 of the first embodiment. Accordingly, just as in the first embodiment, a suction is applied to the liquid in spout 67 when the bottle is being returned from pouring position to erect position. Therefore, the possibility of drip from the end of spout 67 to the wall of the bottle is minimized.

Sixth embodiment (Fig. 12)

In this embodiment, walls 76a, 76b, 76d and 76e of recess 75 are similar to the corresponding walls of Fig. 9. Preferably, slit 50 is omitted in this embodiment. While the recess walls are shown as of reduced thickness so as to make them more flexible, in this embodiment the reduced thickness of the recess walls is optional. The transverse tube-closing wall 76f is located just above the level of spout 77 and is dome-shaped (as viewed in Fig. 12) to provide recess 72 in its lower face. This recess 72 serves the same function as recess 92 of the first embodiment.

In this embodiment, spout 77 is similar to spout 27 in length and in position, but spout 77 is corrugated so as greatly to increase the flexibility thereof. As a result, spout 77 should bend to a greater extent than in the previous embodiments, without creating an excessive strain upon the material of the spout. This makes it less necessary to rely upon the flexibility of the wall of the recess for retraction of the spout when the insert is moved to its stopper position.

The corrugations of spout 77 are in the form of external spiral groove 77a and internal spiral groove 77b. Optionally, spout 77 may be corrugated in any other suitable manner, so as to increase the flexibility thereof.

Preferably, the outer free end portion of spout 77 is smooth, both internally and externally, both because it is unnecessary to bend the outer end portion of the spout, and also to improve the pouring action of the spout.

While in various embodiments the recess wall has been shown and described as having corrugations extending horizontally across the inner recess wall and across the side recess walls, it will be apparent that the corrugations may be varied in any suitable manner so as to impart the desired flexibility and resiliency to the recess wall, while at the same time still making it possible to mold the insert. For example, the corrugations can extend vertically in the inner and side recess walls. Also, the corrugations can extend diagonally.

While I have disclosed preferred embodiments of my invention, and have indicated various changes, omissions and additions which may be made therein, it will be apparent that various other changes, omissions and additions may be made in the invention, without departing from the scope and spirit thereof.

I claim:

1. An insert for the neck of a bottle for service alternately as a bottle stopper and a pouring device, said insert including a tube of flexible and resilient material sized for frictional axial insertion and axial movement within the neck bore, the peripheral wall of said tube having an offset portion between the ends thereof extending longitudinally and also around a portion only of the circumference of the peripheral wall to define a side recess in said tube, said tube having a spout located within said recess and extending generally outwardly from the inner portion of the wall of said recess, the outer end of said spout being spaced from the wall of said recess, the bore of said spout communicating with the bore of said tube, said insert also including tube bore closing means located above the point of communication of the tube bore with the spout bore, said tube being adapted to be lowered within said neck bore so as to dispose said spout within said neck bore, said tube being adapted to be raised within said neck bore, without removal of said tube, so as to dispose said spout above said neck bore.

2. An insert according to claim 1, said insert being made of material which is non-wettable by liquid which has the free flow of water and the like.

3. An insert according to claim 2, said bore closing means comprising a generally transverse wall located just above the spout and shaped to provide a further recess located just inwardly of the inner end of the spout and having a bottom opening, the relative sizes of said bore, said spout and said further recess being such as to permit the general liquid level in the bottle to enter said further recess upon tilting of the bottle for pouring of liquid from the spout, the liquid in the further recess being adapted to drop by gravity upon return of the bottle to non-pouring position, whereby to create a partial vacuum within said further recess, which partial vacuum causes inward suction upon the liquid remaining in said spout.

4. An insert according to claim 2, said spout being flexible and normally protruding outwardly of the main periphery of said tube, said spout being adapted to engage the lip of the bottle and to be flexed into position wholly within said recess upon lowering the insert within said neck bore, said spout being adapted to return to its normal position upon raising said tube to the neck-clearing position of said spout.

5. An insert according to claim 3, said spout being flexible and normally protruding outwardly of the main periphery of said tube, said spout being adapted to engage the lip of the bottle and to be flexed into position wholly within said recess upon lowering the insert within said neck bore, said spout being adapted to return to its normal position upon raising said tube to the neck-clearing position of said spout.

6. An insert according to claim 4, said spout being corrugated so as to increase the flexibility thereof.

7. An insert according to claim 4, the recess wall being thin and flexible and being adapted to be flexed by the force exerted thereon when said spout engages the lip of the bottle.

8. An insert according to claim 5, said recess wall and said bore closing means being thin and flexible and being adapted to be flexed by the force exerted thereon when said spout engages the lip of the bottle.

9. An insert according to claim 4, said recess having a plurality of axially spaced corrugations respectively extending peripherally across the inner portion and the side portions of the recess wall, said recess wall being thereby adapted to flex substantially both below and above said spout when said spout engages the lip of the bottle upon lowering of the insert, so as to permit retraction of the spout within the recess with minimum bending of the spout.

10. An insert according to claim 9, said recess wall being corrugated both above and below the spout, the tube bore closing wall being also corrugated in a direction to permit contraction thereof when the spout is retracted into the recess.

11. An insert according to claim 9, said recess wall being corrugated only below said spout, the tube bore closing wall being also corrugated in a direction to permit contraction thereof when the spout is retracted into the recess.

12. An insert according to claim 9, only said recess wall below said spout being corrugated, the inner recess wall above said spout extending to the main peripheral wall of the tube opposite the inner end of the spout, said bore closing means being located within said recess.

13. An insert acocrding to claim 3, said spout being wholly positioned within said recess.

14. An insert according to claim 4, said recess having a slit extending across the inner portion and the side portions thereof above said spout and below said bore closing means, the wall of said recess below said slit yielding inwardly relative to the wall of said recess above said slit during the retraction of the spout, so as to reduce the bending of said spout insert for retraction thereof, the lower wall being adapted to substantially seal said slit upon return of the spout to its normal position.

15. A combination bottle and insert therefor, said insert being molded of flexible and resilient material and including a tube sized for frictional axial insertion and axial movement within said neck bore, the peripheral wall of said tube having a off-set portion between the ends thereof and extending longitudinally and also around a portion only of the circumference of the peripheral wall to define a side recess in said tube, said tube having a spout located within said recess extending generally outwardly from the inner portion of the wall of said recess, the outer end of said spout being spaced from the wall of said recess, the bore of said spout communicating with the bore of said tube, said insert also including tube bore closing means located above the point of communication of the tube bore with the spout bore, said tube being adapted to be lowered within said neck bore so as to dispose said spout within said neck bore, said tube being adapted to be raised within said neck bore, without removal of said tube, so as to dispose said spout above said neck bore, said neck and said insert having cooperating means for releasably locking said tube in both its lowered position and its raised position.

16. A combination according to claim 15, said insert being made of material which is non-wettable by liquid which has the free flow of water and the like.

17. A combination according to claim 16, said spout being flexible and normally protruding outwardly of the main periphery of said tube, said spout being adapted to engage the lip of the bottle and to be flexed into position wholly within said recess upon lowering the insert within said neck bore, said spout being adapted to return to its normal position upon raising said tube to the neck-clearing position of said spout.

References Cited in the file of this patent

UNITED STATES PATENTS

| | | |
|---|---|---|
| 1,548,241 | Anderson | Aug. 4, 1925 |
| 2,177,758 | Voke | Oct. 31, 1939 |
| 2,690,861 | Tupper | Oct. 5, 1954 |